United States Patent
Allen

Patent Number: 5,486,058
Date of Patent: Jan. 23, 1996

[54] CONTINUOUS TOUCH KEYBOARD

[76] Inventor: Donald E. Allen, 1012 W. Eskridge Ave., Stillwater, Okla. 74075

[21] Appl. No.: 287,785

[22] Filed: Aug. 9, 1994

[51] Int. Cl.$^6$ .................. B41J 5/10; B41J 5/28
[52] U.S. Cl. ............................. 400/485; 400/489
[58] Field of Search .................... 400/477, 485, 400/486, 490, 492, 494, 472, 481, 488, 489; 345/168; 341/22, 23

[56] References Cited

U.S. PATENT DOCUMENTS

| | | | |
|---|---|---|---|
| D. 287,854 | 1/1987 | Crews | 14/100 |
| 4,417,824 | 11/1983 | Paterson | 400/477 |
| 4,556,280 | 12/1985 | Bagby | 350/96.16 |
| 4,560,845 | 12/1985 | Takamura et al. | 200/5 A |
| 4,565,460 | 1/1986 | Kline | 400/490 |
| 4,607,160 | 8/1986 | Sakaino | 250/227 |
| 4,761,522 | 8/1988 | Allen | 200/5 R |
| 4,769,516 | 9/1988 | Allen | 200/5 R |
| 4,824,268 | 4/1989 | Diernisse | 400/486 |
| 4,835,381 | 5/1989 | Sorensen, III | 250/227 |
| 4,836,700 | 6/1989 | Jensen | 400/489 |
| 4,849,732 | 7/1989 | Dolenc | 400/486 |
| 4,886,335 | 12/1989 | Yanagawa et al. | 350/96.2 |
| 4,894,530 | 1/1990 | Kitchen | 250/227 |
| 4,927,279 | 5/1990 | Morgan | 400/486 |
| 4,971,465 | 11/1990 | Hashimoto | 400/485 |
| 4,980,685 | 12/1990 | Souloumiac et al. | 341/31 |
| 5,001,307 | 3/1991 | Blaser | 200/5 A |
| 5,017,030 | 5/1991 | Crews | 400/485 |
| 5,034,602 | 7/1991 | Garcia, Jr. et al. | 250/227.22 |
| 5,073,054 | 12/1991 | McDowell | 400/486 |
| 5,160,919 | 11/1992 | Mohler et al. | 340/711 |
| 5,186,555 | 2/1993 | Chiba . | |

*Primary Examiner*—Ren Yan
*Assistant Examiner*—Steven S. Kelley
*Attorney, Agent, or Firm*—Head & Johnson

[57] ABSTRACT

A continuous touch keyboard usable on a computer terminal, word processor or typewriter and configured to contain fourteen three-way switches, two for each thumb, one for each finger and one under each palm rest. The design is such that the hands and fingers do not need to move about to enter data, the keys being actuated by moving the fingers palmward, outward or pressing down and with equivalent motions of the thumbs and palms. Each switch controls the format of a signal from an emitter via optical fiber to a decoder. A microprocessor provides a digital scanning means and interprets or decodes the proper key position and thus the letter, numeral or function being entered.

2 Claims, 6 Drawing Sheets

CONTINUOUS TOUCH KEYBOARD

BACKGROUND OF THE INVENTION

Field of the Invention

The present invention relates to a finger operated switching apparatus and more particularly to such apparatus which is used by an operator to enter data into a computer, word processor, typewriter or the like.

A conventional typewriter keyboard includes several horizontal rows of keys oriented transversely to an operator. The conventional arrangement of letters of such a keyboard is sometimes referred to as the QWERTY format after the first six letters on the top row of letter keys. The QWERTY format was developed in the late 1800's and has remained the standard keyboard format to date for typewriters as well as for computers, word processors, and other data entry terminals.

The QWERTY format keyboard suffers from several disadvantages. Hand movement up and down the keyboard is required to position the fingers for striking keys at the upper and lower portions of the board. Even when it is not necessary to move the entire hand, substantial finger movement is required to move the finger between keys on adjacent rows or between adjacent keys on the same row. Such hand and finger movement decreases the rate at which an operator can enter data via the keyboard.

Inventors have secured many patents to facilitate data entry on mechanical typewriters, linotype molded type setting machines, and in later decades, on electric typewriters, word processors and computer keyboards. Many are designed to overcome difficulty of data entry on the standard QWERTY design which is expanded to six horizontal banks of 101 vertically activated keys on the computer style keyboard. The recent incorporation of optical fibers into keyboard circuitry offers alternatives for improvement in design, economy, and keyboard micro controller scanning efficiency. Klein U.S. Pat. No. 4,565,460 describes a convex molded cap for each keytop, claiming an improved tactile sense and engagement of the finger. Data input devices using a reduced number of keys by cording with two or more fingers are described in U.S. Pat. Nos. 4,971,465, to Hashimoto 4,836,700, to Jensen and 5,017,030 to Crews which incorporates an adjustable press down switch in the fixed palm rest for Shift and Lock functions. Alternative keyboard arrays to facilitate the operator's hand position are described in U.S. Pat. Nos. 5,001,307, to Blaser 4,560,845 to Takamura and 5,160,919. to Mohler 4,849,732 to Dolenc describes a one-hand (right or left) four-finger letter entry keying device in which the thumb operates eight control and command keys. The other fingers operate laterally on dual columns of four, four, three and two ergonomically angled letter key arrays. Chiba U.S. Pat. No. 5,186,555 compresses a two-hand keyboard into an array of four rows and seven columns of actuators accessed from the sides. Actuators are slidable four ways diagonally in a horizontal plane. Thirteen letter characters may be entered by fingers three, four and five of each hand for maximum conservancy of movement. Morgan U.S. Pat. No. 4,927,279 prescribes ordering the standard typewriter key array in alphabetic sequence except that vowels A E I O U are centered on the middle or lower bank of keys with punctuation characters on either side to facilitate data entry. Diernisse U.S. Pat. No. 4,824,268 groups vowels in the left hand base position. McDowell U.S. Pat. No. 5,073,054 applied a similar concept for a one hand key pad of a word-by-word dictionary or language translator except that vowels E I O U are repeated on the flanks of a five-bank letter array. A scanning optical keyboard is described by Souloumiac et al. U.S. Pat. No. 4,980,695, including a variety of arrays of press down keys which activate a shutter device for selective interruption of the light path between the ends of optical fibers. Optical switches for controlling light emissions between the ends of optical fibers are also described by U.S. Pat. Nos. 4,556,280, to Bagby 4,607,160, to Sakakino 4,886,335, to Yanagawa and 4,984, 530 to Kitchen. A wide view radiant energy receiver is described by Sorensen U.S. Pat. No. 4,835,381. The inventor's prior patents: Allen U.S. Pat. Nos. 4,761,522 and 4,769,516 describe an ergonomic arrangement of three-way, three-spring finger switches operating radially palmward, outward and downward with right and left hand letter manuals, a right hand number manual, and a left hand computer function manual. This device manufactured in prototype has proven commercially infeasible with 24 actuators and 260 components.

SUMMARY OF THE INVENTION

The present invention consists of fourteen three-way actuators oriented to conform to the palmward closure of the right and left-hand fingers, and to the skeletal orientation of the forearms on a small molded plastic enclosure. Characters are assigned to individual fingers in a pattern generally similar to the QWERTY arrangement to facilitate transition from the present standard to a more convenient data entry system. For this purpose, high frequency letters are entered by a short palmward stroke of the finger tip; mid-frequency letters are entered with a short outward stroke; and low frequency letters are entered with a short downward stroke of the finger tip. By this means, with English standard letter text, 74 percent of strokes are palmward, which is the easiest for the human hand; 20 percent are outward, and 6 percent are downward, which is slightly more difficult than the radial strokes.

Each of the fourteen three-way actuators consists of a three-way optical fiber switch wherein is located an infrared emitter opposed across a narrow slot by two optical fiber ends slightly separated and oriented toward the emitter. Those fibers are coupled to an inner or to an outer common fiber terminating separately at one sensor receiving four palmward common fibers, and a second sensor receiving four outer common fibers. A shaped shutter is operated from above by the actuator head so as to block selectively either the inner, palmward fiber, or the outer fiber, or both fibers. The sensing action as to which key is being entered is performed by a micro controller, which is programmed to scan the fourteen actuators at a rate of 62 khz. When any of the actuators are at rest, i.e., neither stroked palmward, outward nor downward, the infrared emitted light signal is transmitted by both optical fibers and the micro controller reports no activity. If one of the actuators is activated, i.e., moved palmward, outward or downward, the infrared light path from the emitter will be blocked to either one or the other optical fibers in the case of palmward or outward motion or to both optical fibers in the downward motion. This digital output signal will be read by the microprocessor and interpreted as the entry of the appropriate letter, number or symbol. In the typical arrangement with the shutter in the neutral position a binary code of 11 is read, while a binary code of 01 or 10 is read when the actuator is tilted radially, and 00 when the actuator is pressed downward enabling the shutter to block light to both optical fibers simultaneously.

The invention orders data entry in two modes. For letter text mode, the ten finger tips rest in U-shaped actuators with exactly three characters selectable on each actuator. The numbers mode is invoked by pressing the toggle switch under the left palm rest, to shift the right hand manual between letter text mode and number text mode. The left manual remains in letter text mode to support punctuation, spacing, and the: enter switch in concert with number data entry. The elevated palm rests have the dual function of holding the palms in a superior position relative to the finger switches, plus three operational functions on each palm rest to transfer data entry between said functions. Pressing the right palm switch toggles the computer functions on the left manual. A fourth transfer function is provided by the "Fun" (Function) switch on the auxiliary thumb actuators for cursor control by either hand, regardless of mode for either manual, and for certain computer functions.

The characters for the several operational modes are printed in distinctive format on the surface plate, and are supplemented with indicator lamps for computer, number, and caps conditions. The status and characters of the keyboard is thus visible to the operator while the hands are in position over the fourteen switches, except that the palms cover ESCape, CTL (control), ALTernate, INSert, NUMBERS and COMPUTER.

DETAILED DESCRIPTION OF THE PREFERRED EMBODIMENTS

Figure 1:
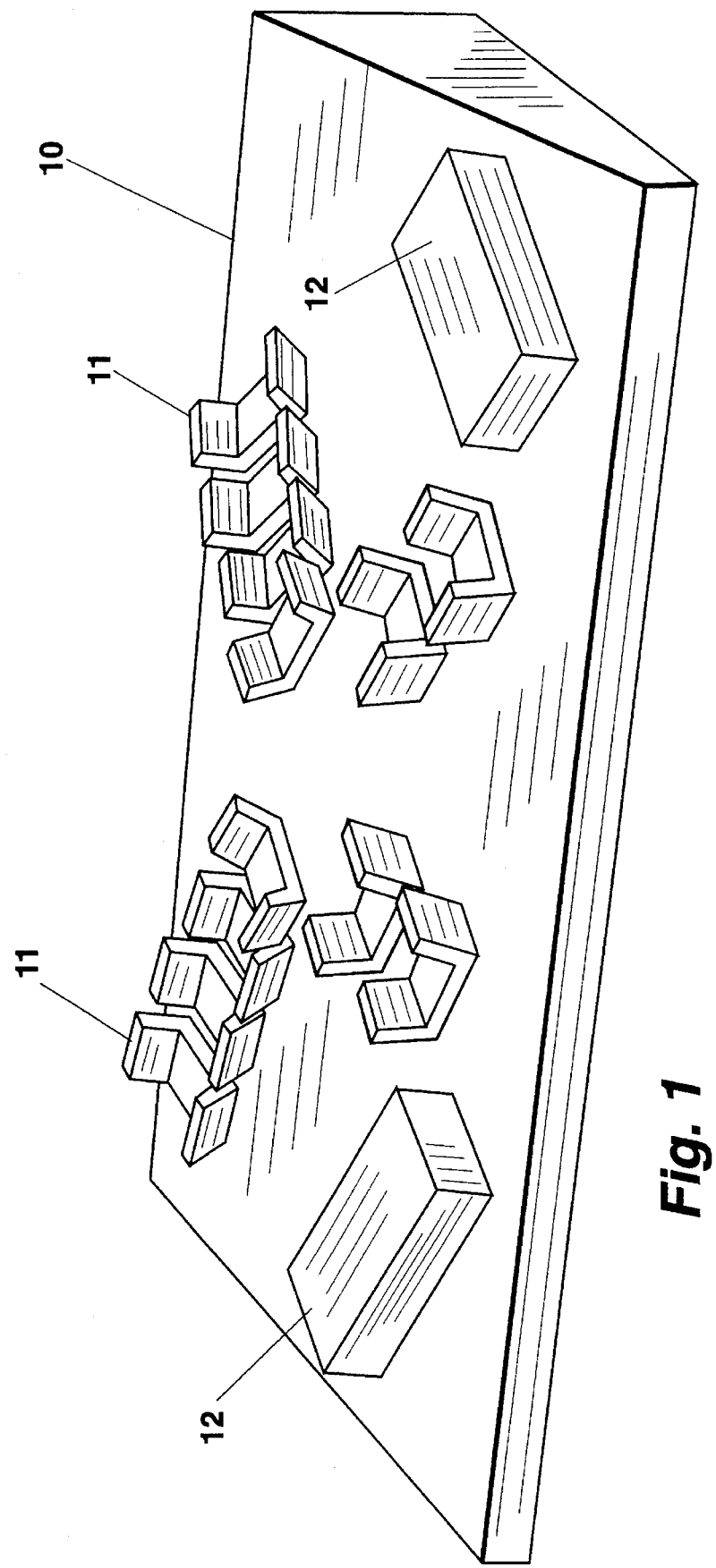
FIG. 1 shows the assembled continuous touch keyboard.

It is the object of the present invention to provide a data entry keyboard to be operated by both hands where the hands would rest naturally over the keyboard and each of the keys could be entered without undue motion of the hand or fingers. As shown in FIG. 1 the configuration is achieved by the use of fourteen three-way switches, seven to each manual. Four three-way switches are positioned under the second through the fifth fingers of each hand when in its normal palm down position. One three-way switch is positioned under the palm and two three-way switches are arranged under the thumb of each hand. This allows for a total of fourteen switches. The keyboard consists of an enclosure 10, the fourteen three-way switches 11, two of which are covered by the palm rests 12.

It is the further object of the present invention that the hands rest on the keyboard in their normal orientation thus improving the ease of use and reducing the possibility of injury from extended use.

Figure 2:
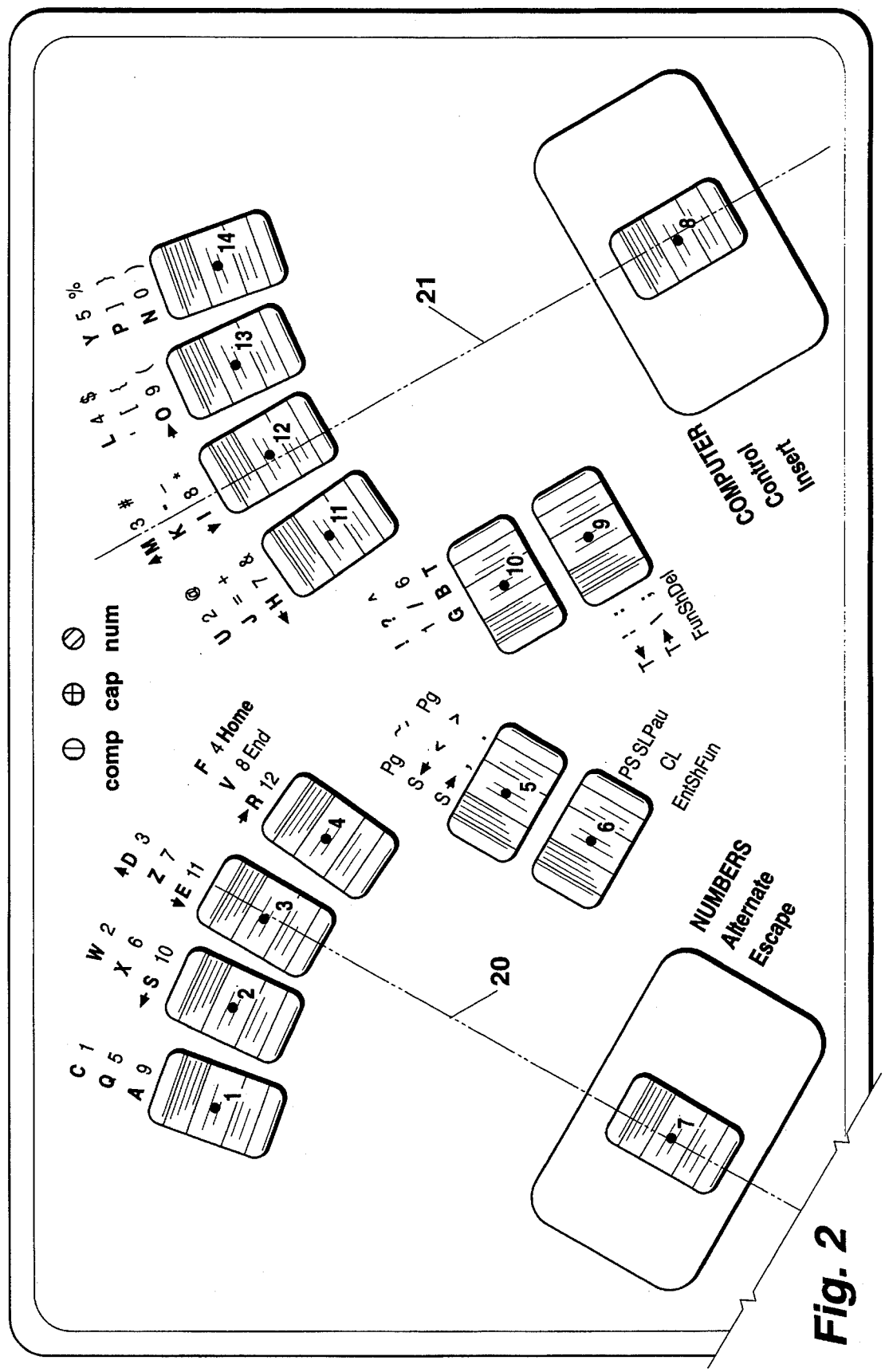
FIG. 2 shows the format of the keyboard with the characters, symbols and functions plus three mode indicator lamps and the relative positions of the fourteen finger actuators two of which are enclosed in the palm rests.

FIG. 2 shows the English alphabet version of the keyboard with a convergence of about 60° between the axes 20 and 21 of the two manuals through the center of the palm rests and the center of the long (third) finger switch. The axis of motion for the second and fourth finger switches converges at about a 5° angle, and that of the short (fifth) finger converges at about a 10° angle relative to the center axes, to conform to the angle of closure as the fingers are drawn toward the palm of the hand. Switches for fingers 2, 4, and 5 are displaced slightly palmward relative to that of the axial (third) finger to conform to the arc of the finger tips of the pendant cupped hand as it approaches either manual. The tilt axes of the palm rests and thumb switches are normal to the center axes of the right and left manuals.

Figure 3:
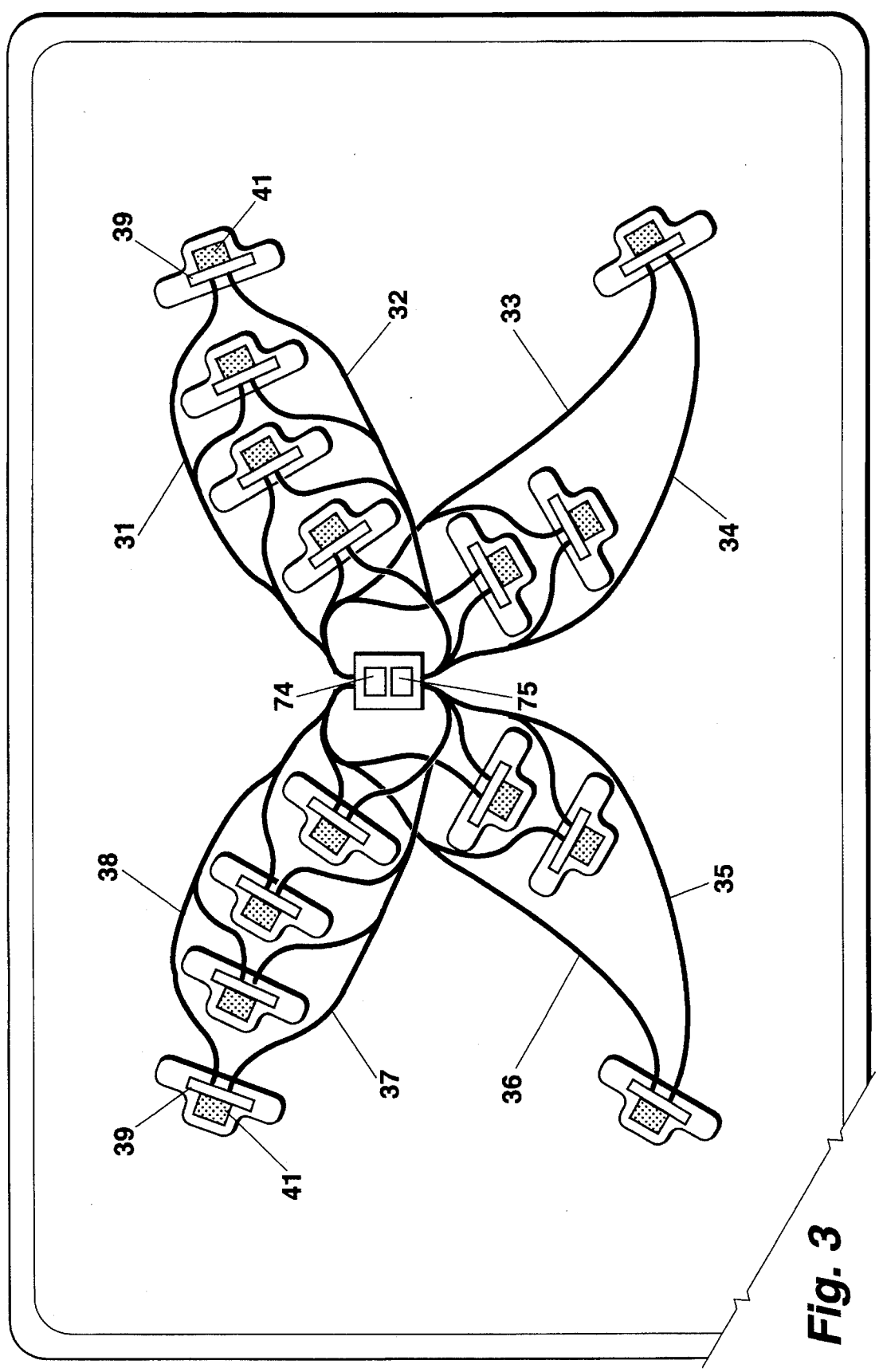
FIG. 3 shows the fourteen actuator housings and two sensor housings, molded integrally as part of the surface board and as seen from below. Four inner and four outer common light paths conduct light pulses sequentially from each emitter to one or both sensors, determined by the shutter position.

FIG. 3 shows the array of molded housings extending from the under side of the surface board with the system of eight common light paths, of which four conduct the outer fiber signals to the outer sensor, and four conduct the inner fiber signals to the inner sensor. Areas of light path 36 crossing path 37 and path 32 crossing path 33 are insulated by cladding. The slot 39 permits installation and movement of the shutter. The emitter 41 is housed opposite the outer and inner optic fiber ends. The outer and inner light sensors 74, 75 are encased in a similar housing. Housings for palm rests auxiliary thumb switches and third finger switches terminate at the plane of the printed circuit board.

Figure 4:
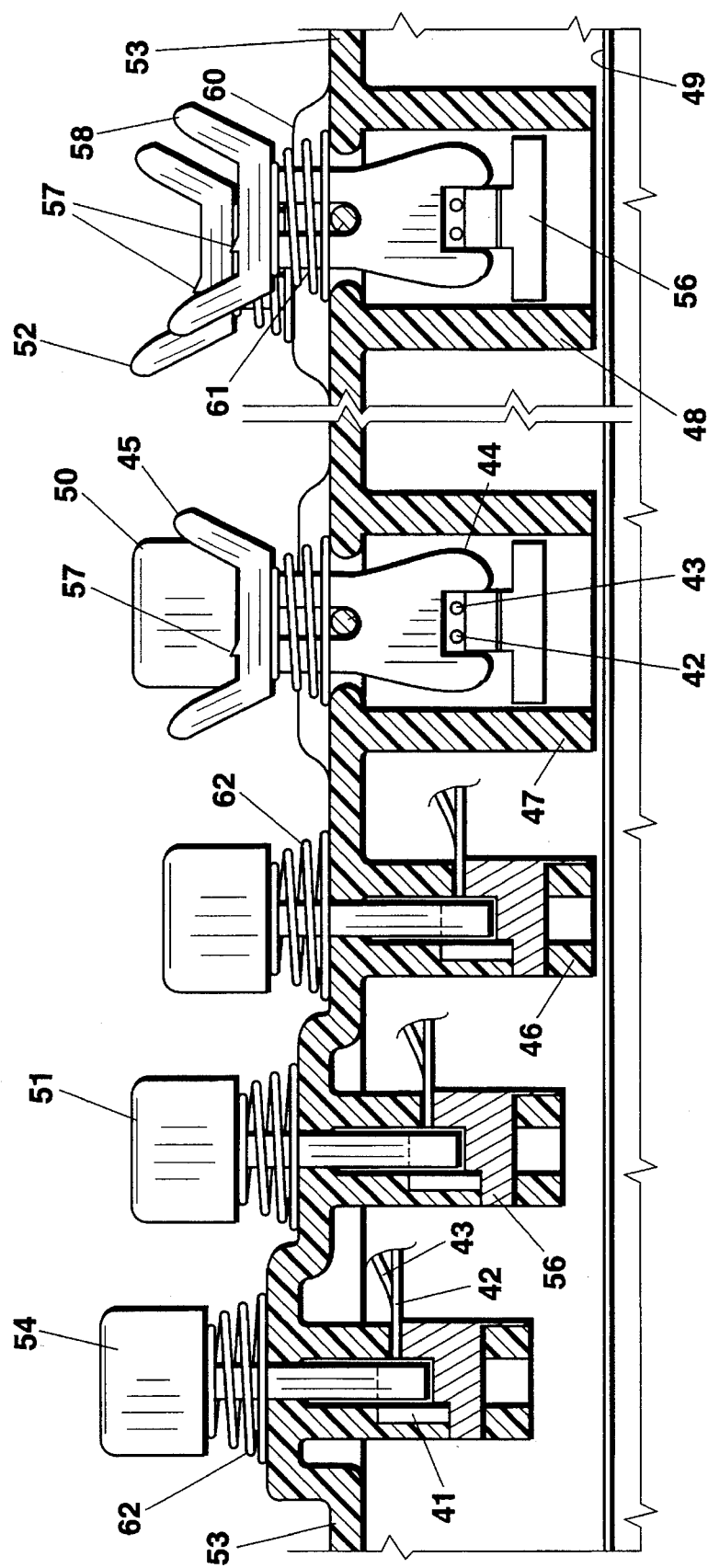
FIG. 4 shows the frontal elevation of the seven switch assemblies of the left manual, detailing the vertical elevation created by platforms molded in the surface board for the short fingers and mid-length fingers and the base position thumb switch. The opposition of light emitters and optic fiber ends is shown in side and frontal views. A lateral three-level retainer plug supports the emitter on one side, the optic fiber ends on the opposed side, and a ridge to center the shutter on the vertical stroke.

FIG. 4 is a vertical planar projection showing left manual actuators in their several housings. Actuators for the long finger 55, palm rest 45 and auxiliary thumb actuator 58 operate at the board surface plane. Their under board housings extend downward to the circuit board plane 49. Actuators for the second and fourth fingers 50 and 51, are elevated above keyboard surface 53 approximately 0.16 inches, and actuators for the short finger 54 and the base thumb position 52 are elevated approximately 0.32 inches by small platforms. Shown in the side view, the light emitter 41 opposes the two optic fiber ends with the shutter in the raised position. A three-level transverse retainer plug 56 secures the emitter on one side, the optic fibers on the other side, and the mid-portion constitutes a rounded centering guide for downward closure of the shutter. This function is also shown in the frontal cross section of the palm rest switch. The actuator caps are all identical, and each includes a transverse ridge 57 for engagement by the finger nail for fingers 2, 3, 4 and 5. This ridge has no function on the thumb and palm rest actuator, and does not abrade the inner fleshy side of the thumb. The frontal cross section shows the position of the shutter 44 relative to the two optic fiber ends, and the vertical centering guide for selectively masking optic fibers by radial or vertical movement. The end view of the retainer plug 56 shows its relation to the optic fiber ends and the actuator housing. The stem portion of the shutter 44 is slotted to permit assembly around he cylindrical molded pivot 61 which bridges the center of the actuator keyboard slot. Each actuator is suspended in the open position by a conical spring 62 with a resistance of approximately 2 ounces (60 grams).

Figure 5B:
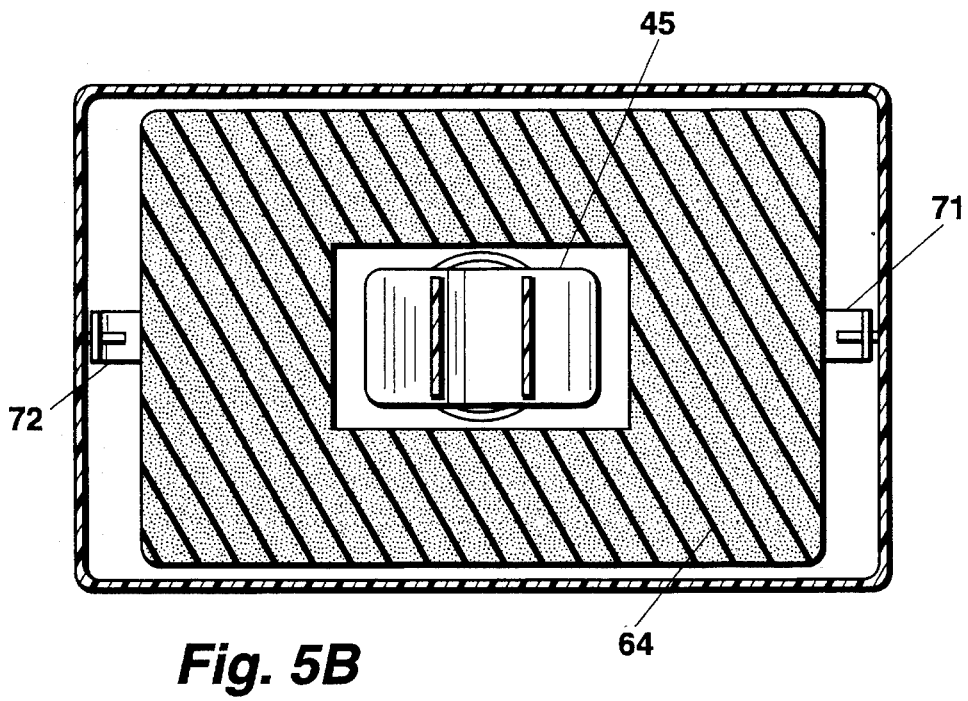
FIGS. 5a and 5b show a means of controlling the palm rest switch in vertical section. The movable cover is designed to slide inward or outward against two centering springs and downward against the resilient sponge plus the action of the conical helix spring.
Figure 5A:
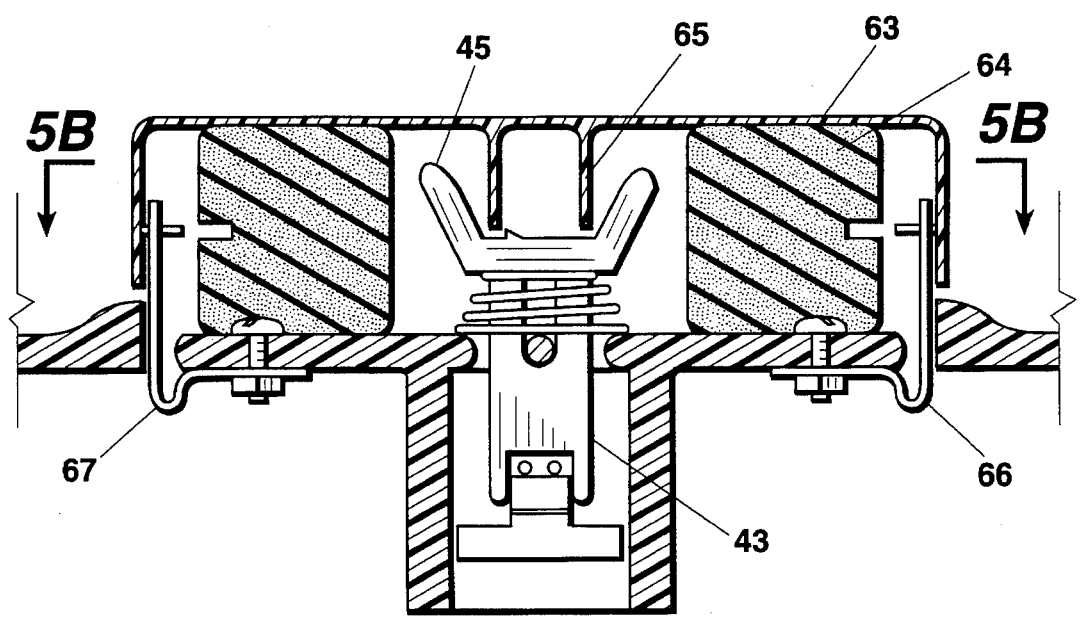

FIGS. 5a and 5b show a palm rest assembly with a plastic cap 63 covering a soft spongy support 64 around the actuator 5 with projecting plastic blades 65 in close proximity to the interior edges of the floor of the actuator cap. The surface of the spongy support is covered with a lubricous surface to facilitate lateral low friction movement against the forward and rearward centering springs 66,67.

Figure 6:
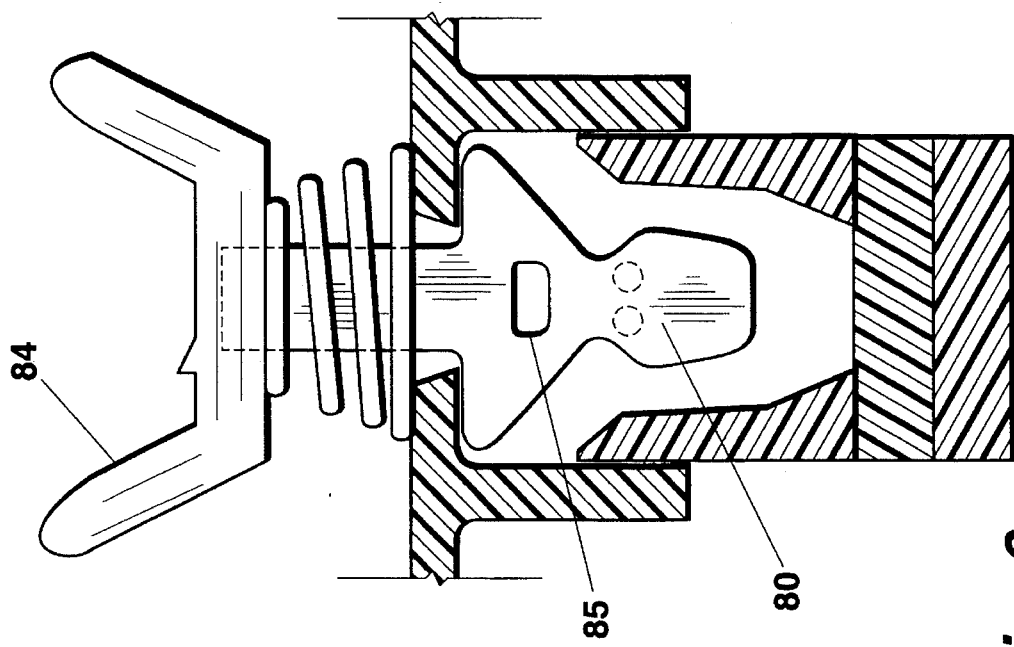
FIG. 6 shows a design for the horizontal section of the palm rest.

FIG. 6 shows the end view of the palm rest cover and spring assembly 68. The spongy support 64 is cemented to the surface of the keyboard 53.

Figure 7:
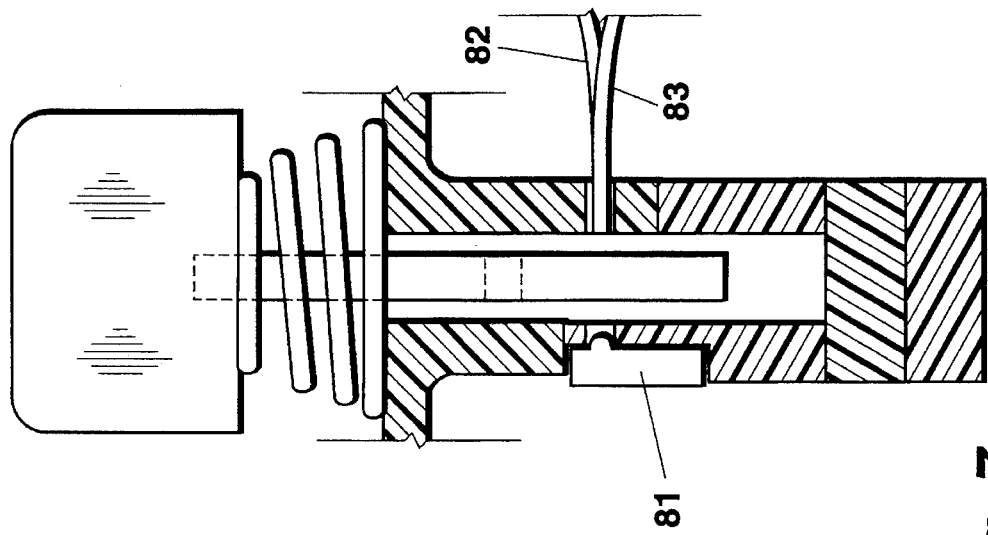
FIG. 7 shows the vertical view which is the same for both ends of the palm rest.

FIG. 7 is a horizontal cross section along line AA of FIG. 5 showing the spongy support surrounding the actuator 45 and the retainer rods projecting through spring slots opposite the openings in the support material 71, 72.

Whereas, the present invention has been described in relation to the drawings attached hereto, it should be understood that other and further modifications, apart from those shown or suggested herein, may be made within the spirit and scope of this invention.

What is claimed is:

1. A keyboard for in-putting data into an information processing device, and which keyboard may be operated by the operator without removing the hands from the keyboard, comprising:

a keyboard base or enclosure;

a plurality of four position actuators mounted on said keyboard base or enclosure arranged conformably to the natural position of both right and left hands of an operator;

each of said actuators comprising a truncated vee cap, and a stem terminating in a shutter, shaped to permit selective blocking of light impulses to either the inner or the outer of two transversely mounted optic fibers or of both fibers, by inward, outward or downward movement of the actuator cap by the respective fingers;

two of said actuators being mounted on said keyboard conformably under the right and left palms of the operator, the said actuator caps being covered by palm rests with means to activate said actuators by motion of the palms;

means for assigning letters, numerals, symbols and functions to each of said positions of said actuators;

means for sensing each of the four positions of each of said actuators; and where said ten base actuators are arranged on said keyboard in three dimensions to conform to the arc of fingertips and to their differences in length between the thumb and the other four fingers in a cupped pendant hand, and the actuators for fingers 2, 4, and 5 and the thumb are elevated above the other actuators.

2. A keyboard for in-putting data into an information processing device, and which keyboard may be operated by the operator without removing the hands from the keyboard, comprising:

a keyboard base or enclosure;

a plurality of four position actuators mounted on said keyboard base or enclosure arranged conformably to the natural position of both right and left hands of an operator;

each of said actuators comprising a truncated vee cap, and a stem terminating in a shutter, shaped to permit selective blocking of light impulses to either the inner or the outer of two transversely mounted optic fibers or of both fibers, by inward, outward or downward movement of the actuator cap by the respective fingers;

two of said actuators being mounted on said keyboard conformably under the right and left palms of the operator, the said actuator caps being covered by palm rests with means to activate said actuators by motion of the palms;

means for assigning letters, numerals, symbols and functions to each of said positive of said actuators;

means for sensing each of the four positions of each of said actuators; and ten of said base actuators being mounted on said keyboard are arranged in three dimensions to conform to the arc of fingertips and to their differences in length between the thumb and the other four fingers in a cupped pendant hand, and the actuators for fingers 2, 4, and 5 and the thumb are elevated above the other actuators;

where the assignment of letter characters to said actuators is as follows:

|  |  | Contractile | Vertical | Extensile |
|---|---|---|---|---|
| Left | Finger 5 | a | q | c |
|  | Finger 4 | s | x | w |
|  | Finger 3 | e | z | d |
|  | Finger 2 | r | v | f |
|  | Thumb 1 | S> | | |
|  |  | (S> = space right) | | |
|  | Aux Thumb | Enter | Shift | Function |
|  | Palm | Numbers | Alternate | Escape |
| Right | Finger 5 | n | p | y |
|  | Finger 4 | o | , | l |
|  | Finger 3 | i | k | m |
|  | Finger 2 | h | j | u |
|  | Thumb 1 | t | b | g |
|  | Aux Thumb | Delete | Shift | Function |
|  | Palm | Computer | Control | Insert |
|  | With either shift key activated | | | |
| Left | Finger 5 | A | Q | C |
|  | Finger 4 | S | X | W |
|  | Finger 3 | E | Z | D |
|  | Finger 2 | R | V | F |
|  | Thumb 1 | S< | < | > |
|  |  | (S< = back space) | | |
|  | Aux Thumb | Enter | Shift | Function |
|  | Palm | Numbers | Alternate | Escape |
| Right | Finger 5 | N | P | Y |
|  | Finger 4 | O | " | L |
|  | Finger 3 | I | K | M |
|  | Finger 2 | H | J | U |
|  | Thumb 1 | T | B | G |
|  | Aux Thumb | Delete | Shift | Function |
|  | Palm | Computer | Control | Insert |
|  | With computer function activated; right manual in letter mode. | | | |
| Left | Finger 5 | 9 | 5 | 1 |
|  | Finger 4 | 10 | 6 | 2 |
|  | Finger 3 | 11 | 7 | 3 |
|  | Finger 2 | 12 | 8 | 4 |
|  | Thumb 1 | Pg | ' | $Pg_v$ |
|  |  | (Pg = page up) | | ($Pg_v$ = page down) |
|  | Aux Thumb | Pause | Scroll | PrintScreen |
|  | Palm | Numbers | Alternate | Escape |
|  | With numbers function activated; left manual in letter mode. | | | |
| Right | Finger 5 | 0 | ] | 5 |
|  | Finger 4 | 9 | [ | 4 |
|  | Finger 3 | 8 | - | 3 |
|  | Finger 2 | 7 | = | 2 |
|  | Thumb 1 | 6 | / | 1 |
|  | Aux Thumb | ; | \ | T> (Tab right) |

|  |  | Contractile | Vertical | Extensile |
|---|---|---|---|---|
|  | Palm | Computer | Control | Insert |
|  | With numbers and shift function activated, left manual in letter mode: | | | |
| Right | Finger 5 | ) | } | % |
|  | Finger 4 | ) | { | $ |
|  | Finger 3 | * | − | # |
|  | Finger 2 | & | + | @ |

|  | Contractile | Vertical | Extensile |
|---|---|---|---|
| Thumb 1 |  | ? | ! |
| Aux Thumb | : | \| | T< (Tab left) |
| Palm | Computer | Control | Insert. |

\* \* \* \* \*